(No Model.) 3 Sheets—Sheet 1.
W. H. HOLSCLAW.
COMBINED COTTON SEED AND CORN PLANTER.

No. 435,750. Patented Sept. 2, 1890.

ATTEST:
INVENTOR:
W. H. Holsclaw
By J. N. McIntire
Attorney (No Model.) 3 Sheets—Sheet 2.

W. H. HOLSCLAW.
COMBINED COTTON SEED AND CORN PLANTER.

No. 435,750. Patented Sept. 2, 1890.

ATTEST: INVENTOR:
W. H. Holsclaw
By J. N. McIntire
Attorney

THE NORRIS PETERS CO., PHOTO-LITHO., WASHINGTON, D. C.

(No Model.) 3 Sheets—Sheet 3.
W. H. HOLSCLAW.
COMBINED COTTON SEED AND CORN PLANTER.
No. 435,750. Patented Sept. 2, 1890.
Fig. 5.
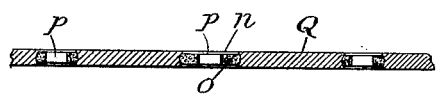
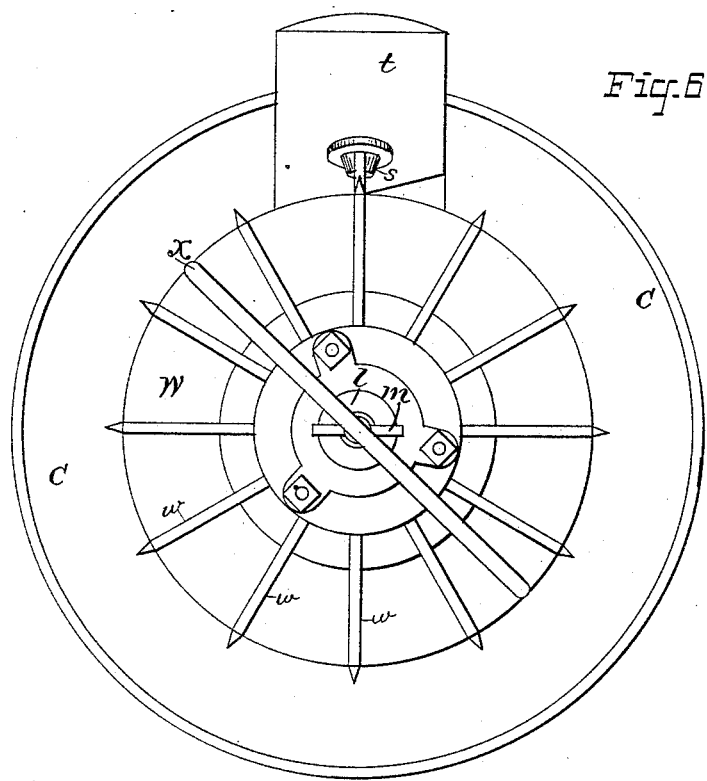
Fig. 6.
ATTEST:
INVENTOR:
W. H. Holsclaw
By J. N. McIntire
Attorney

UNITED STATES PATENT OFFICE.

WILFORD H. HOLSCLAW, OF LOUISVILLE, KENTUCKY, ASSIGNOR TO B. F. AVERY & SONS, OF SAME PLACE.

COMBINED COTTON-SEED AND CORN PLANTER.

SPECIFICATION forming part of Letters Patent No. 435,750, dated September 2, 1890.

Application filed April 29, 1890. Serial No. 349,873. (No model.)

*To all whom it may concern:*

Be it known that I, WILFORD H. HOLSCLAW, of Louisville, in the county of Jefferson and State of Kentucky, have invented certain new and useful Improvements in Combined Cotton-Seed and Corn Planters; and I do hereby declare that the following is a full, clear, and exact description of the same, reference being had to the accompanying drawings, forming part of this specification.

My invention relates to that kind or type of seed-planter which is adapted, by the removal of some of its parts and the substitution therefor of other differently-constructed parts, to be used either for the purpose of planting cotton-seed or for planting corn, beans, peas, &c., in either hills or drills, and has for its main object to provide for use a planter of this type which, while capable by suitable adjustments of either planting cotton-seed by a forced feed in a continuous drill in any desired quantity, or planting corn, peas, sorghum, and other small seeds in either hills or drills, shall be strong, durable, easy to adjust and operate, and comparatively economic of manufacture.

To this main end and object my invention may be said to consist in the novel structural features and combinations of devices which will be found hereinafter more fully described and that will be more specifically pointed out and defined in the claims of this specification.

To enable those skilled in the art to which my invention relates to make and use machines containing either wholly or in part the novel features peculiar to my improved planter I will now proceed to more fully describe the same, referring by letters to the accompanying drawings, which form part of this specification and in which I have shown my invention carried into effect in that precise form of machine in which I have so far successfully practiced it, though as to some or all of the several novel features of construction the form of the machine may, of course, be more or less modified.

Figure 1:
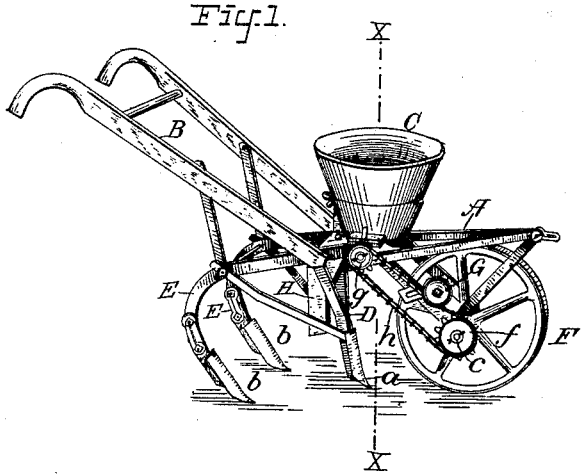
Figure 2:
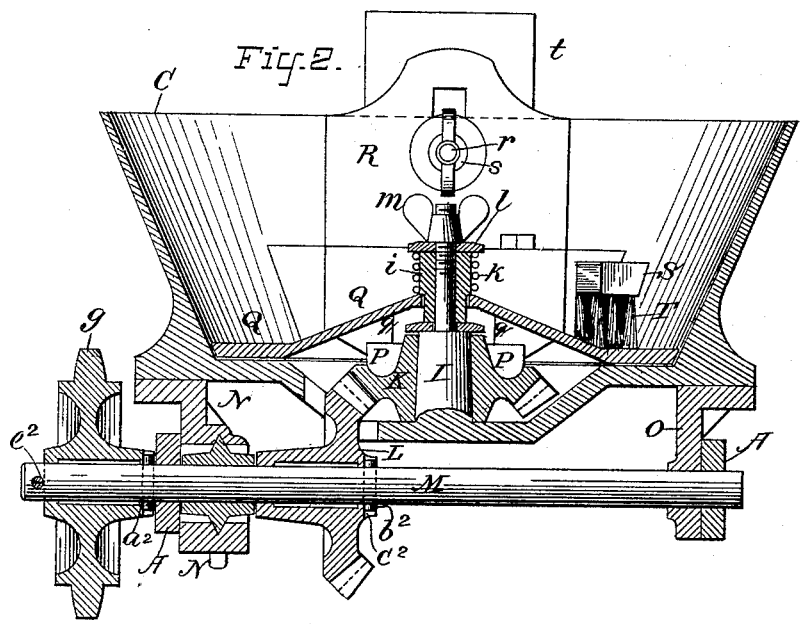
Figure 3:
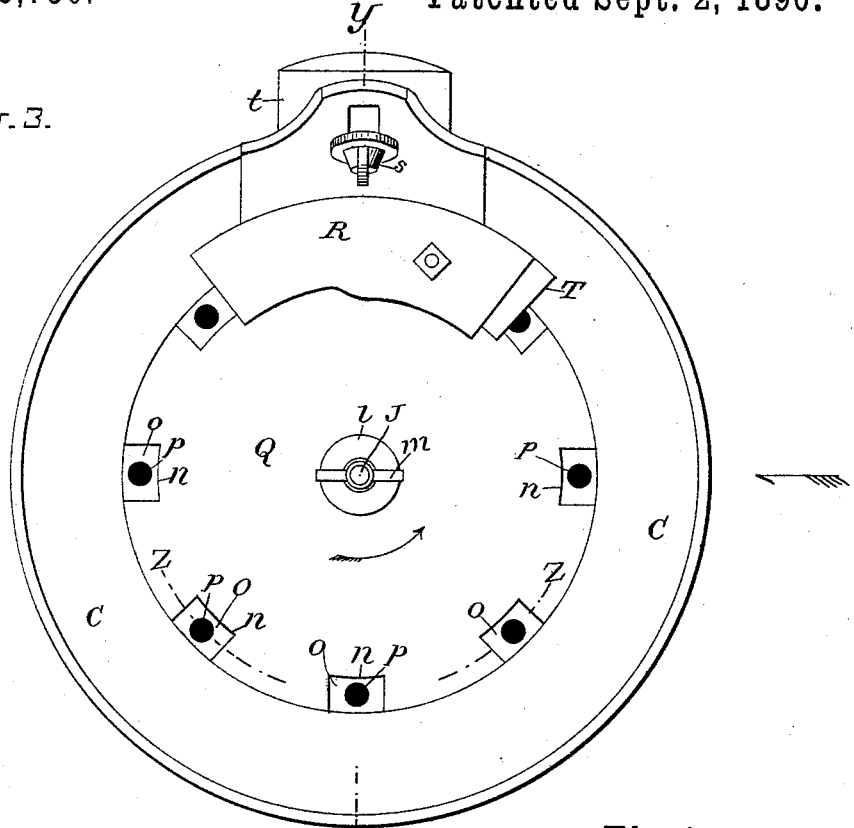
Figure 4:
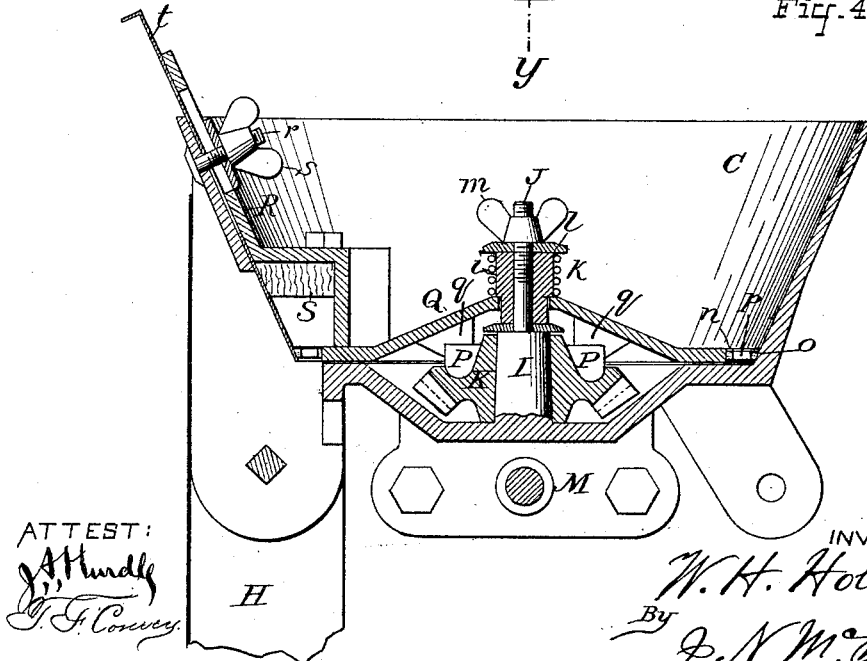

In the drawings, Figure 1 is a perspective view of a machine made according to my invention. Fig. 2 is a vertical cross-section of the same at the line $x$ $x$ of Fig. 1, with the drive-chain and frame-work removed to simplify the drawing. Fig. 3 is a top view of the hopper-like portion of the machine. Fig. 4 is a vertical section at the line $y$ $y$ of Fig. 3. Fig. 5 is a detail partial section, taken in a curved plane indicated by the line $z$ $z$ of Fig. 3, to show particularly the seed-pockets, &c. Fig. 6 is a top view of the hopper and its working parts, but with some of the parts shown in the other views removed and another form of planting-plate attached to transform the machine into a cotton-seed planter.

In the several figures the same part will be found always designated by the same reference-letter.

A is the metallic frame, B the handles, and C the hopper, of the planter, the said frame A being formed or provided, preferably in the manner shown, (see Fig. 1,) with a properly-braced metallic central standard D, on the lower end of which is mounted, as shown, the opener $a$ and two rearwardly-arranged standards E E, which carry the covering-blades $b$ $b$, all as clearly illustrated.

In the lower portion of the forward depending portion of the metallic frame A is mounted in suitable bearings the shaft or axle $c$ of the ground and drive wheel F, and fast on one (and an outwardly-projecting) end of said axle is mounted a sprocket-wheel $f$, from which is banded thence to the sprocket-pinion $g$ an endless drive-chain $h$, through the medium of which the rotation of the wheel F, as the machine is drawn along over the ground, operates to drive the sprocket-wheel $g$, for a purpose to be presently explained.

For the purpose of adjusting the endless-chain belt $h$ and keeping it in a proper working condition the depending portion of the frame-work A in which the drive-wheel F is mounted is provided with a suitable tightener or adjustable idler G, that may be set to and held fast in the requisite position, as clearly shown (see Fig. 1) in the drawings.

Communicating with the opening in or seed-exit at the lowermost rear portion of the hopper C is a chute H, which projects downwardly immediately in rear of the opener $a$, and through which the seeds descend and from the lower open end of which they fall into the trench or opening in the ground made by the said opener, all in a manner familiar to those skilled in the art.

As shown, the metallic hopper C and the working parts secured thereto are mounted on the frame A and suitably fastened thereto, and these working parts are constructed and operate as I will now explain. The bottom of the hopper C is dish-shaped or has a central frustuminally-shaped depression, from the middle of which rises an integrally-formed cylindrical teat I, which is preferably chilled in casting and which has cast therein the upwardly-projecting screw-threaded stud or bolt J. The chilled teat I serves, as shown, as a journal, on which turns a horizontal bevel-gear K, the lower end of the hub of which rests on the central depressed portion of the hopper-bottom, (see Fig. 2,) and the teeth of which face downward and engage with those of another bevel-gear L, that is mounted on the shaft M. The gear K is prevented from rising by a washer that rests on top of the teat I, as shown. The dishing or depressed bottom portion of the hopper is cast with an aperture through it at one side, as seen, and through this opening the uppermost part of the bevel-gear L passes, so as to run in engagement with the gear K. The shaft M is mounted to turn freely in suitable bearings or boxes formed in the two depending portions or brackets N and O of the hopper, and it is to one end of this drive-shaft M that the sprocket-wheel g, before mentioned, is secured. Hence the rotation of said wheel g, by the means hereinbefore alluded to, operates to turn the said shaft, and it in turn drives the gear L, which drives the horizontal gear K, located within the hopper. This gear K is formed or provided with a series (in the case shown two) of upwardly-projecting lugs P, which engage, in a manner and for a purpose to be presently explained, with the downward projections q q of the rotatory planting-plate Q, which latter is made dish-shaped in a direction opposite to that of the depressed portion of the hopper-bottom, and is arranged, as shown, so that its lower flat portion rests and rotates on the uppermost flat portion of the hopper-bottom. The said plate Q, with its elevated or convex middle portion, and the hopper-bottom, with its opposing central depression, form a sort of centrally-located receptacle or housing within which are located the gear K, with its lugs P, and the engaging projections q of the planting-plate.

i is a thimble which is removably combined with the stud or screw-bolt J, and which sleeves or encircles the said stud, and the smaller portion of which forms the arbor round about which turns the upper perforated middle portion of the plate Q, the said plate being held down in a working position yieldingly by the presser-spring k, which is coiled round the larger part of the said thimble or sleeve i, with its lower end resting on the top surface of the convex portion of plate Q, and its upper end held down by a collar or washer l, which in turn is held in place against the upward thrust of the said spiral spring by a thumb-nut m, screwed onto the upper end of the screw-stud J.

In the flat portion of the circular plate Q are formed about equidistant circumferentially of and extending radially inward from its perimeter, a series of rectangular notches or cut-outs n, each of which contains and carries a correspondingly-shaped piece o of thick leather or other suitable material, which is perforated with a vertical hole p of any desired size and shape that constitutes a seed-pocket. In the formation of the notches or cut-outs n, just above alluded to, the two opposite and preferably parallel edges of the cut-out are cut concave or V-shaped, (see Fig. 5,) so that the leather or other filling pieces or blocks o, which have their corresponding edge made convex, will slide and fit into said cut-outs and be held in place therein without any other means of securement, thus permitting the removal of said leathers and the substitution therefor of other similarly-shaped pieces, which may, however, be perforated with holes of a different size to adapt them to receive charges of seed of a different capacity.

R is a vertically-adjustable metallic cover-plate held in place against the inner surface of the seed-hopper at one side of the latter, as shown, by a bolt r and thumb-nut s, and clamped between said device R and the surface of the hopper is an adjustable sheet-metal piece t, all as clearly shown.

The device R is provided with a wooden block or piece S, which constitutes the back or stock of a brush T, the bristles of which project downward, as seen, all in such manner that as the filled pockets p of the leathers o pass beneath said brush in the direction indicated by the arrow at Fig. 3, any superfluous collection of the seed will be swept off, leaving each pocket, as it arrives at the locality of the exit-opening of the hopper, with just its full complement of seed to be discharged by gravity into the chute H.

In the operation of the machine as so far described, and as shown ready for use at Figs. 1 to 5, inclusive, of the drawings, the corn, peas, or other analogous seed to be sown are as usual supplied in sufficient quantity to the hopper C, and the machine then being drawn along over the field, as usual, under the management of the man who grasps the handles B, the rotation of the ground-wheel F will cause its axle or shaft c to rotate the sprocket-wheel f, which, through the medium of the chain belt h, banded thence to the sprocket-wheel g, will drive the latter and thus rotate in the proper direction and at the requisite speed the shaft M. The rotation of said shaft operates, through the medium of the bevel-gear L, keyed fast thereon, to drive the bevel-gear K, and this gear, by means of its upwardly-projecting lugs P, rotates the planting-plate Q in the direction indicated by the arrow at Fig. 3. During the rotation of this disk-like plate Q, on top of which rests the mass of seeds in the hopper, each and every one of the apertures or pockets p is filled with the seed, and travels, thus filled, beneath the clearing-off brush T, and on arrival at the exit-opening of the hopper drops its contents into the chute II, from whence the charges of seed descend into the trench, which is opened up in advance of the constantly-moving chute by the opener a, the deposited seeds being then covered over with earth as the machine advances by the action of the covering-blades b b. It will be seen that by having leathers o with different-sized holes in them the seed-pockets p may be of one or another size to suit different kinds of seed, and that by omitting the apertures in some of the leathers the revolving plate will, without changing its rotary speed, operate to deposit the charges of seed in the chute II more or less frequently, thus planting in hills farther apart or nearer together, as may be desired.

By the combination of the housed or inclosed gear K, provided with the actuating-lugs P, with the rotary plate Q, formed with lugs q and a drive-gear L, working through an aperture in the depressed portion of the hopper-bottom, all as shown, a simple, compact, and efficient form of machine is produced, in which there is no liability of any interference with the free movements of any of the working parts by the contents of the hopper, and by having the gear K mounted to revolve on the chilled post-like journal I, the internal gear system is made capable of working perfectly and durably.

The arrangement of the drive-chain h and its engaging sprocket-wheels is such, it will be seen, that there is no liability of any clogging up of the driving mechanism of the machine by any trash which may be lifted or thrown up by the movements of the ground-wheel F, and all the movements of the working parts being continuous and rotatory none of the parts are subjected to any shocking strains or wear, so that they may be all made comparatively light and cheap and yet be perfectly efficient and durable.

By means of a suitable attachment, fertilizing material may be distributed during the planting operation, and by simply transposing the sprocket-wheels, the speed of the planting-plate may be varied, as desired. The opener a is of course adjustable, so that the depth of the planting may be regulated, as may be desired, and, as clearly shown, the various necessary adjustments of the different movable parts of the machine may be easily made correctly by any unskilled person.

The peculiar construction by which the leathers or other pieces o are retained in their seats in a sufficiently permanent but perfectly removable manner is, it will be seen, exceedingly simple and at the same time perfectly efficient.

To transform the machine shown in Figs. 1 to 5, inclusive, into a cotton-seed planter, I have only to remove those parts which are not necessary and substitute for the pocketed rotatory plate Q the planting-plate W and its attachments. (Seen at Fig. 6.) This plate, it will be understood, has its under side formed or provided with engaging devices, similar to those marked q on the plate Q of the other figures, so that it is rotated in the same direction and in like manner as plate Q; but being provided simply with the fingers w, as shown, it operates by the action of these continuously-moving fingers to simply force the cotton-seed from the lower strata of the mass in the hopper into and through the exit-opening of the hopper and thence into the chute II for planting. The said fingered plate W is provided with a suitable agitator x and has its several parts made and combined in a novel manner, which I need not, however, stop to explain herein, as the structural peculiarities of this cotton-planting plate form part of the subject-matter of another application by me, wherein they are necessarily fully described.

Having now so fully described the construction and operation of my improved machine that those skilled in the art can make and use it, what I claim therein as new, and desire to secure by Letters Patent, is—

1. In a seed-planter, the combination of the following-named instrumentalities, viz: first, a hopper having a central depression in its bottom and having a journal or stud projecting upwardly therefrom, as specified; second, a planting-plate having a raised central portion and formed or provided at the under side with one or more projections, as specified; third, a bevel-gear arranged intermediately of the said hopper-bottom and planting-plate, mounted to turn on said upwardly-projecting journal or stud and having one or more engaging lugs, and, fourth, suitable means by which the said gear is held in a working position, all substantially as and for the purposes hereinbefore set forth.

2. In a seed-planter, the combination, with the depressed hopper-bottom having an aperture therein and formed with an upwardly-projecting journal, the planting-plate formed with a centrally-raised portion and provided with one or more engaging projections at its under side, and an intermediately-arranged gear provided with one or more lugs which engage with the projections of said planting-plate, of a bevel-gear which engages with the said intermediately-arranged gear through the said hopper-bottom aperture and operates to drive the last-mentioned gear, all substantially as and for the purposes set forth.

3. The combination of the hopper-bottom, the planting-plate, the intermediately-arranged gear mounted on the upwardly-projecting journal of the hopper-bottom, and means for holding the planting-plate down in its working position with a yielding pressure, all substantially as hereinbefore set forth.

4. In a seed-planter, the combination, with the rotatory planting-plate formed with a series of peripheral notches or cut-outs, of a series of removable pieces of leather or other suitable material of the same or less thickness than the thickness of the planting-plate and operating to fill up or close all of the said peripheral notches or cut-outs, some one or more of the said removable pieces being formed with an aperture or apertures, as specified, the whole constructed and operating together in substantially the manner and for the purposes hereinbefore set forth.

5. In combination with the peripherally-notched planting-plate, one or more removable pieces adapted to fill the said peripheral notch or notches and composed of leather or some other non-metallic material, which may be easily perforated (to form the seed pocket or pockets) by one unskilled in the use of tools, all substantially as and for the purposes hereinbefore set forth.

6. A rotatory planting-plate having peripherally-arranged cut-outs, in combination with the pocket-pieces or filling devices of some suitable material, when the adjacent edges of the said cut-outs and filling-plates are adapted to engage with each other by reason of one being grooved and the other ribbed, all in substantially the manner and for the purpose hereinbefore set forth.

7. In a combined cotton-seed and corn planter, a hopper formed with a depressed portion from which projects upwardly a journal, a gear mounted on said journal and provided with engaging lugs P, a removable rotatory corn-planting plate, and the removable attachments specified, for conjoint action with said planting-plate, whereby the planting-plate W, adapted to feed cotton-seed, may be substituted for the corn-planting plate and its adjuncts, all in substantially the manner and for the purposes set forth.

In witness whereof I have hereunto set my hand this 21st day of April, 1890.

WILFORD H. HOLSCLAW.

In presence of—
CHAS. TEMPLE,
HARRY ALLMOND.